United States Patent
Wu et al.

(10) Patent No.: US 9,727,616 B2
(45) Date of Patent: Aug. 8, 2017

(54) SYSTEMS AND METHODS FOR PREDICTING SALES OF ITEM LISTINGS

(75) Inventors: Xiaoyuan Wu, Shanghai (CN); Alvaro Bolivar, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 1287 days.

(21) Appl. No.: 12/498,209

(22) Filed: Jul. 6, 2009

(65) Prior Publication Data

US 2011/0004509 A1    Jan. 6, 2011

(51) Int. Cl.
```
G06Q 30/00      (2012.01)
G06N 5/02       (2006.01)
G06F 15/18      (2006.01)
G06Q 10/00      (2012.01)
G06F 17/30      (2006.01)
G06Q 10/06      (2012.01)
G06Q 30/06      (2012.01)
```

(52) U.S. Cl.
CPC ... *G06F 17/3053* (2013.01); *G06Q 10/06375* (2013.01); *G06Q 30/00* (2013.01); *G06Q 30/0631* (2013.01)

(58) Field of Classification Search
None
See application file for complete search history.

(56) References Cited

U.S. PATENT DOCUMENTS

| | | | |
|---|---|---|---|
| 5,377,095 A * | 12/1994 | Maeda et al. | 705/7.35 |
| 6,272,507 B1 * | 8/2001 | Pirolli | G06F 17/30011 707/999.005 |
| 6,489,968 B1 * | 12/2002 | Ortega et al. | 715/713 |
| 7,401,025 B1 | 7/2008 | Lokitz | |
| 7,487,146 B2 | 2/2009 | Friedman | |
| 7,526,478 B2 | 4/2009 | Friedman | |
| 7,584,200 B2 | 9/2009 | Pfeifer | |
| 7,603,366 B1 | 10/2009 | Gritsay et al. | |
| 7,624,117 B2 | 11/2009 | Fuerst et al. | |
| 7,660,786 B2 | 2/2010 | Wang et al. | |
| 7,797,197 B2 | 9/2010 | Kumar et al. | |
| 7,937,353 B2 | 5/2011 | Bernoth | |
| 8,051,040 B2 | 11/2011 | Johnson et al. | |
| 8,090,754 B2 | 1/2012 | Schmidt et al. | |
| 8,239,275 B1 | 8/2012 | Lyren et al. | |

(Continued)

OTHER PUBLICATIONS

Saunders, C.; Taking the "Pulse" of the Market with eBay and Terapeak; Nov. 11, 2004; ecommerce-guide.*

(Continued)

*Primary Examiner* — Matthew Gart
*Assistant Examiner* — Ashley Y Young
(74) *Attorney, Agent, or Firm* — Maschoff Brennan

(57) ABSTRACT

A method and a system are disclosed for predicting sales of item listings on a network-based system. For example, historical transaction data generated by the network-based system is accessed to create a prediction model. A feature predictive of an item being sold through the network-based system is selected. A training set is created by extracting the predictive feature from the historical transaction data. The prediction model is trained based on the training data set to predict the probability of an item listing being sold through the network-based system. The prediction model is used to rank search results, and the search results can be presented through the network-based system.

22 Claims, 7 Drawing Sheets

(56) References Cited

U.S. PATENT DOCUMENTS

| | | |
|---|---|---|
| 8,386,406 B2 | 2/2013 | Bolivar et al. |
| 2002/0082902 A1* | 6/2002 | Ando et al. ............... 705/10 |
| 2003/0004781 A1* | 1/2003 | Mallon .............. G06Q 10/06 705/7.31 |
| 2011/0010324 A1 | 1/2011 | Bolivar et al. |

OTHER PUBLICATIONS

Dimoka, A., et al.; Understanding and Mitigating Product Uncertainty in Online Auction Marketplaces; Nov. 2007; Industry Studies 2008.*

"U.S. Appl. No. 12/603,348, Notice of Allowance mailed Jul. 9, 2012", 6 pgs.

"U.S. Appl. No. 12/603,348 , Response filed Oct. 9, 2012 to Non Final Office Action mailed Oct. 1, 2012", 15 pgs.

"U.S. Appl. No. 12/603,348, Non Final Office Action mailed Oct. 1, 2012", 8 pgs.

"U.S. Appl. No. 12/603,348, Notice of Allowance mailed Oct. 23, 2012", 11 pgs.

\* cited by examiner

SYSTEMS AND METHODS FOR PREDICTING SALES OF ITEM LISTINGS

CROSS REFERENCE TO RELATED APPLICATIONS

This application is related to co-pending, commonly assigned, U.S. patent application Ser. No. 12/603,348, entitled "SYSTEMS AND METHODS FOR MAKING CONTEXTUAL RECOMMENDATIONS", filed on Oct. 21, 2009, which is hereby incorporated by reference in its entirety.

TECHNICAL FIELD

This application relates generally to network-based publishing and transaction systems operating over a distributed network and, in some examples, to systems and methods for predicting sales of item listings within a network-based transaction system.

BACKGROUND

The explosion of information available over network-based systems such as the Internet can overwhelm a person attempting to locate a desired piece of information or product. For example, over the last decade the categories of products available through a typical network-based commerce system has grown exponentially. This dramatic growth has left users with the problem of sorting and browsing through enormous amounts of data to find information or products relevant to their needs. Search engines and recommendation systems have both been developed to assist in locating both information and products within network-based systems.

Most network-based systems selling products and services online include at least a rudimentary search capability. Many network-based systems also allow users to filter or sort search results according to price, availability, or some similar product or service attribute. Some network-based systems also allow users to filter search results by age of listing. While these filtering and sorting mechanisms may assist a user in sifting through large sets of data, these mechanisms do little to assist the potential buyer in finding the most desirable products or services.

Recommendation systems have been implemented to attempt to assist users in locating relevant information or products. A successful recommendation system on a network-based commerce system not only saves users time in locating relevant products but also brings extra profits to the commerce system's operators.

Most current recommendation systems utilize some form of collaborative filtering to produce a single scalar number for each potential relationship. Two different basic types of collaborative filtering are typically employed by recommendation systems: user-based or item-based. User-based collaborative filtering focuses on grouping like user behavior. Item-based recommendation systems focus on grouping similar items.

BRIEF DESCRIPTION OF THE DRAWINGS

Some embodiments are illustrated by way of example and not limitation in the figures of the accompanying drawings in which.

DETAILED DESCRIPTION

Figure 1:
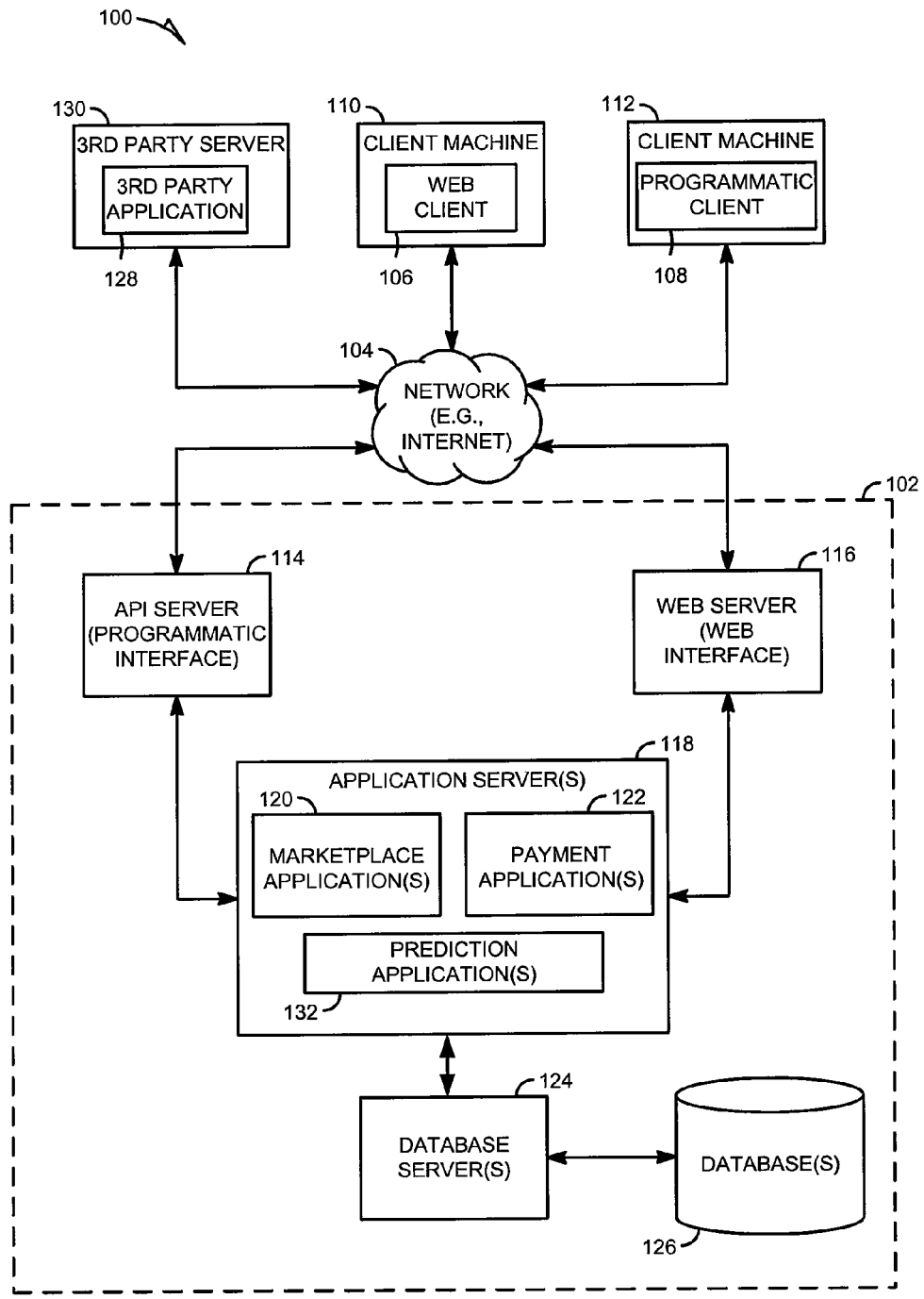
FIG. 1 is a block diagram illustrating an example architecture for a network-based system within which systems and methods for predicting sales of item listings can be implemented.

Example systems and methods for predicting sales of item listings are described. The systems and methods for predicting sales of item listings, in some example embodiments, may provide ranked search results or recommendations based on predicted sales within a network-based system. In the following description, for purposes of explanation, numerous specific details are set forth in order to provide a thorough understanding of example embodiments. It will be evident, however, to one skilled in the art that the present embodiments of the invention may be practiced without these specific details. It will also be evident that the use of predicted sales information is not limited to the examples provided and may include other scenarios not specifically discussed.

The term "market" as used herein, is intended to mean any platform or venue (physical or electronic) by which a seller may offer a product or service to one or more buyers. As such, the term "market" should be understood to include a multi-seller, multi-buyer system, an online retail platform or store, or an advertisement publication system or platform. In accordance with an example embodiment, the system can provide ranked search results based on predicted sales of each individual item listing within the search results. In another example embodiment, the system can provide recommendations based on predicted sales of potential recommendation item listings. As network-based transactional systems are flooded with more and more items for sale, it becomes increasingly difficult for buyers to make a purchase decision. Ranking items that are more likely to actually sell, based on historical metrics, item features, and seller profile information, can assist a buyer in making a purchase decision. If items are ranked by the likelihood of actually being sold, buyers are more likely to see the items they are willing to buy at the top of search results lists or in recommendations. This can reduce the amount of time spent finding the desired items and improve user satisfaction with a particular network-based transaction system.

Estimating a conversion (sale) probability for standard catalog items can be accomplished by analyzing historical sales data. For example, if demand for the iPhone (from Apple, Inc. Cupertino, Calif.) has been high over the last few weeks (or months) then it may be reasonable to assume that it may remain high for a period of time. However, on a network-based marketplace, such as eBay.com (from eBay, Inc. San Jose, Calif.) where multiple sellers can list any sort of product or service, predicting whether a particular item listing will be successfully sold is much more difficult. Many of the items that can be listed within a network-based marketplace may be unique, such as a vintage stamp or specialized pottery item. Even for some product-based items, like an iPhone, it is hard to predict whether any specific iPhone listing is going to be successfully sold. Successfully selling an item can include the seller receiving the price they were seeking, meeting a reserve price in a reserve type auction, or merely having the item bid on during an auction. It has been observed that two identical products from different sellers with different profiles or using different pricing methods can be treated completely differently within a network-based marketplace, such as eBay. For example, one seller may publish an iPhone for sale with a fixed price listing, while another seller may publish the same version iPhone with an auction type listing with a low reserve price. In this example, the fixed price listing may be completely ignored by potential purchasers, while the auction may receive hundreds of bids with the auction listed iPhone selling for more than the fixed price listing. Because a network-based marketplace involves additional variables, simple empirical measurement may not properly estimate conversion probability of any particular item listing.

In order to account for the observed variability in user behavior within a network-based marketplace, item, buyer, and seller metrics can be used to determine whether a particular item is likely to be sold. When faced with a list of items within a network-based marketplace, a buyer may have a series of shopping criteria in mind, referred to as purchase criteria. These shopping criteria are used by the buyer in evaluating item listings and the sellers that published the item listings. Only after an overall consideration of all aspects associated with the item listing is the buyer likely to make a purchase decision. For example, buyers often appear to care about an item's price and the seller's feedback score (or reputation). Table 1 includes a list of potential prediction criteria that can be used to analyze the factors that may be important to a buyer on a network-based marketplace. The list of potential prediction criteria is broken down into item or product-based features and seller features.

TABLE 1

Prediction Criteria

Item Features

Category Popularity
Item Velocity
Item Popularity
Number of Competitive Listings
Conversion Rate of Similar Listings
Price
Sale Type (Auction vs. Fixed Price)
Item Quantity
Best Offer
Return Policy
Store Inventory
Seller Features Feedback Score (Reputation)
Percentage of Positive Feedback
Top Seller Level
Type of Seller (Professional v. Causal)

The list of prediction criteria provided in Table 1 is an example created based on an analysis of eBay; a different network-based marketplace, such as Amazon.com (from Amazon.com, Inc. of Seattle, Wash.), may include different prediction criteria in order to properly predict sales of item listings. A classifies publisher such as craigslist.org (craigslist online community, San Francisco, Calif.) is yet another example of a network-based marketplace that may require different or additional prediction criteria to properly predict whether a listed item will be successfully sold. Thus, for each different network-based marketplace a different set of prediction criteria may be used as predictive item or seller features.

The terms "sold," "sale," or "conversion" as used herein, are intended to mean any sort of desired outcome from the publication of an item listing. For example, on the eBay platform, sold typically refers to a traditional product or service sale. However, on craigslist.org sold or conversion, as used herein, may refer to the successful rental of an apartment listing or even responses to a personal ad.

Predictive Item Features

The item-related purchase criteria include category popularity, item velocity, item popularity, number of competitive listings, conversion rate of similar listings, price, sale type, best offer, return policy and store inventory, among others. Category popularity considers what percentage of the item listings within a particular category are historically sold. On a network-based marketplace such as eBay, item listings are divided into categories. EBay currently has almost thirty thousand (30,000) leaf categories within its single-parent category tree (http://listings.ebay.com/). The conversion rate for each leaf category is likely to be completely unique. For example, in some popular categories over ninety five percent (95%) of listed items may be sold, while in other categories less than one percent (1%) of listed items may be sold. An example method of calculating category popularity includes determining the historical conversion rate for each category.

$$CategoryPopularity = \frac{\# \text{SoldItemsCategory\_i}}{\# \text{TotalItemsCategory\_i}}$$

Item velocity refers to how quickly particular items are sold. In other words, Item velocity refers to how many units per time period are sold. Item velocity can also be referred to as the rate of conversion for a certain item. Item velocity can be calculated by determining the number of items sold over a specific time period.

Item popularity refers to how often is a particular item searched for or purchased within a network-based marketplace. In an example, item popularity can be used to evaluate how often words in an item's title are used as keywords for searches within the network-based marketplace. A query log for a network-based marketplace search engine can reflect the distribution of the keywords that potential buyers are interested in. In this example, a daily query log can be leveraged along with item titles to determine item popularity. Item popularity can be calculated with the following equation:

$$ItemPopularity = \sum_j Q(term_j)$$

Where the title of item i has j terms, and $Q(term_j)$ denotes the query frequency of term j. If the terms of an item title are very popular in a query log, the items may be exposed within search results frequently, making the item more likely to be sold.

In another example, item popularity can be calculated in a manner similar to category popularity, by determining how many items were sold versus the number of items actually available for sale, over a certain time period. This method of calculating item popularity may require items to be uniquely identifiable within the network-based marketplace.

The number of competitive listings can influence an item's likelihood of being sold, as more listings tend to reduce the opportunity for any particular listing to stand out. In an example, the number of similar items in a particular category is calculated for each item, to determine the number of competitive item listings. Similar items can be determined by using title distance (e.g., determining the similarity in title from one listing to another). In another example, similar item listings can be determined by evaluating item listing attributes, such as manufacturer or model number.

The conversion rate of similar items is an indication of the historic sales of similar items. In an example, the conversion rate of similar items can be determined using the following formula:

$$ConversionRate = \frac{|Sim'(item_i)|}{|Sim(item_i)|}$$

Where $Sim(item_i)$ is a set of items that are similar to item i, and $Sim'(item_i)$ indicates a subset of similar items that were sold successfully on the network-based marketplace.

Price can be a major factor in a buyer's decision to purchase a particular item. Price can be most meaningful when compared between similar items. In this example, price is compared against a set of similar items to determine a relative price for each item. The relative price of item i can be calculated by the following equation:

$$Price_i = P(Item_i) - \overline{P}(Sim(Item_i))$$

Where, $P(Item_i)$ is the current price of item i, and $\overline{P}(Sim(Item_i))$ is the average price of similar items. In these examples, similar items can be determined by evaluating title distance, item attributes, categorization, or some combination of methods.

Network-based marketplaces such as eBay can offer a seller a variety of mechanisms for selling products or services. One such mechanism is a fixed-price item listing where the seller sets a particular price for an item. Another such mechanism is an auction listing, where the seller may set an initial price and allow potential buyers a certain time period to place bids on an item. Some network-based marketplaces may also offer a combination listing type that allows for a fixed-price offer and bidding. In this example, the sales type will be either auction or fixed-price. Historical purchase data can be evaluated to determine whether a fixed-price or auction type listing encourages purchases of items within a particular category.

The quantity of a particular item available within a single item listing can have an effect on the likelihood of selling the item within a network-based marketplace. In an example, historical purchase data is evaluated to determine whether buyers prefer to purchase items with multiple quantities available.

The ability to return an item can have a significant effect on a buyer's comfort level in making a purchase through a network-based marketplace. Return policies can include the circumstances under which an item may be returned, whether a refund is available on returned items, whether a re-stocking fee is charged for returns, and who pays for return shipping, among others. Each of these return criterions can be factored into an overall return policy score for each item. In some examples, historical transaction data can be evaluated to determine which return criteria appear most important to potential buyers.

Certain network-based marketplaces offer sellers the ability to allow a potential buyer to make an offer on an item listing. For example, eBay listings can include a "Best Offer" option that allows buyers to submit a price they are willing to pay. In this example, this is another binary feature; either the listing includes this option or it does not. In certain examples, historical transaction data can be analyzed to determine a buyer's preference for being able to make an offer. Another binary feature is store inventory. In certain network-based marketplaces sellers can establish virtual stores. A virtual store can allow a seller to advertise or present all item listings available from the seller within a customized setting. Once again, historical transaction data can be evaluated to determine whether being part of store inventory improves the likelihood of conversion (e.g., sale) for an item listing.

Predictive Seller Features

The seller-related purchase criteria include seller feedback score, percentage of positive feedback, top seller level, and type of seller, among others. In some network-based marketplaces buyers are given the opportunity to rate the purchase experience with a certain seller, providing feedback that can be visible to other potential buyers. Sellers may also be given an opportunity to rate buyers in a purchase transaction, which may help to ensure balance in the feedback system. Feedback is a form of reputation and provides potential buyers with another criterion with which to evaluate any particular purchase. In an example, a feedback score includes both positive and negative feedback. A seller's feedback score can include feedback obtained from only selling activities or from both selling and purchasing activities. Another related purchase criterion is percentage of positive feedback. Having a large amount of feedback may indicate that a particular seller has been very active within a particular network-based marketplace. However, the percentage of positive feedback may provide a buyer a better indication of the trustworthiness or quality of goods provided by a particular seller. Generally, a buyer is likely to prefer a seller with a higher percentage of positive feedback. The percentage of positive feedback can be calculated as follows:

$$\% \ PositiveFeedback = \frac{\# \ PositiveFeedbackEntries}{\# \ TotalFeedbackEntries} * 100$$

In certain network-based marketplaces, sellers can attain different seller levels, such as platinum or gold. In other network-based marketplaces sellers can be scored, with higher scores indicating a higher level. These seller levels can be used to indicate the experience level of a seller within the network-based marketplace. Seller levels can be based on time as a seller, number of transactions, feedback scores, or a combination of factors. Another seller related criteria is whether the seller is a professional (or formal company)

versus an individual selling a single or limited number of items through the network-based marketplace. Again, historical transaction data can be evaluated to determine whether buyers prefer purchasing from a professional or casual seller.

Prediction Models

In an example, predicting whether a new item listing can be sold involves developing a prediction model from one or more of the purchase criteria listed above. Prediction models can be trained via machine learning algorithms. In an exemplary embodiment, given an item candidate (e.g., new item listing), the models can calculate conversion probability by using a vector of purchase criteria (also referred to as prediction features). This concept can be extended to the calculation of confidence or probability scores computed by the model to rank a set of items. Hence, a user can enter a search result and receive a set of results ranked according to each item's probably of conversion (e.g., sale).

In certain examples, the learning algorithms can include various forms of regression, such as linear or logistic regression. Regression is a statistical mechanism for determining the relationship between two random variables. In an example, one of the variables is a vector of prediction features, while the other variable indicates whether the item listing would be sold. The prediction model is calculated using either linear regression or logistic regression, in this example. Other examples can include different regression models, involve some form of combining regression models, or use an alternative machine-learning algorithm.

Linear regression attempts to model the relationship between two variables by fitting a linear equation to the observed data (historical transaction data in this example). One variable is considered to be an explanatory variable, and the other is considered to be a dependent variable. Linear regression can be calculated as follows:

$$y = b_0 + \sum_{j=1}^{n} b_j x_j + e$$

Where x is the vector of prediction features and y represents the likelihood of conversion of the given item listing. Also, e is a random variable (residual) with mean zero, and the coefficients $b_j$ ($0 \leq j \leq n$) are determined by the condition that the sum of the square residuals is as small as possible. Therefore the linear combination with $b_j$ should be better than those with any other coefficients.

Logistic regression is a regression model for binormally distributed dependent variables. It is a generalized linear model that uses the logit as its link function. Logistic regression attempts to find coefficients $b_j$ ($0 \leq j \leq n$) to fit x to a logistic transformation of the probability, which is also called a logit, calculated as follows:

$$\text{logit}(q) = \log\left(\frac{q}{1-q}\right) = b_0 + \sum_{j=1}^{n} b_j x_j$$
$$\frac{q}{1-q} = e^{\text{logit}(q)}$$

Instead of a least-squared deviation criterion for the best fit, logistic regression uses a maximum likelihood method, which maximizes the probability of getting the observed results given the regression coefficients.

The logistic regression is used to predict an output variable Y, given a set of input features X. Y can be 1, if a candidate item listing is sold, and 0 otherwise. X can be a vector of prediction feature values associated with the item listing. For example, the vector might include relative price of the item listing and the feedback score of the seller. The model can then return the estimated probability, $P(Y=1|X=\bar{x})$. The logistic regression model learns a vector of weights, w, one for each input feature X. The actual probability is calculated as follows:

$$P(Y=1 | X = \bar{x}) = \frac{\exp(\bar{x} \cdot \bar{w})}{1 + \exp(\bar{x} \cdot \bar{w})}$$

The following sections provide additional detail regarding an example system architecture and example methods of predicting sales of item listings within a network-based marketplace using the prediction features and prediction models discussed above.

Platform Architecture

FIG. 1 is a block diagram illustrating an example architecture for a network-based system within which systems and methods for predicting sales of item listings can be implemented. The block diagram depicting a client-server system 100, within which an example embodiment can be deployed, is described. A networked system 102, in the example forms of a network-based marketplace, on-line retail site, or publication system, provides server-side functionality, via a network 104 (e.g., the Internet or Wide Area Network (WAN)) to one or more client machines 110, 112. FIG. 1 illustrates, for example, a web client 106 (e.g., a browser, such as the INTERNET EXPLORER browser developed by MICROSOFT CORPORATION of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120, payment applications 122, and prediction applications 132. The application servers 118 are, in turn, shown to be coupled to one or more databases servers 124 that facilitate access to one or more databases 126. In some examples, the application server 118 can access the databases 126 directly without the need for a database server 124.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. The payment applications 122 may also be configured to present recommendations, generated by the recommendation modules, to a user during checkout. The prediction applications 132 may provide prediction of an item listing's potential to be sold on the networked system 102. The ranking applications 132 can be configured to use all of the various communication mechanisms provided by the networked system 102 to present search results and/or recommendations to users. While the marketplace applications 120, payment applications 122, and ranking applications 132 are shown in FIG. 1 to all form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present embodiments of the invention is of course not limited to such an architecture, and could equally well find application in a distributed, or peer-to-peer, architecture system, for example. The various marketplace applications 120, payment applications 122, and ranking applications 132 could also be implemented as standalone software programs, which do not necessarily have networking capabilities.

The web client 106 accesses the various marketplace applications 120, payment applications 122, and ranking applications 132 via the web interface supported by the web server 116. Similarly, the programmatic client 108 accesses the various services and functions provided by the marketplace applications 120, payment applications 122, and ranking applications 132 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102. Additionally, the third party website may provide search results or user recommendations for items available on the networked system 102 through the ranking applications 132.

Ranking Modules

Figure 2:
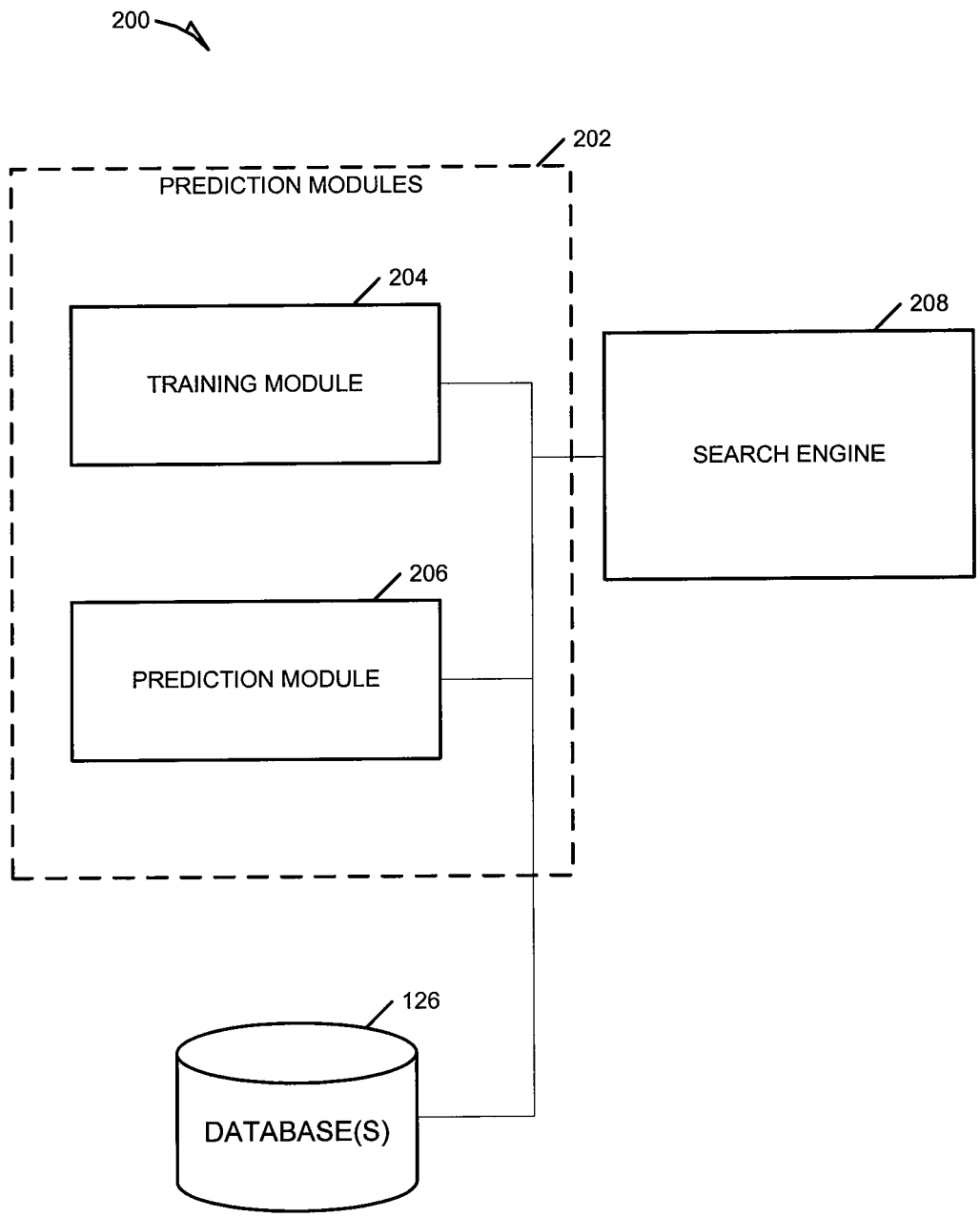
FIG. 2 is a block diagram illustrating an example system for predicting sales of item listings within a network-based system.

FIG. 2 is a block diagram illustrating an example system for predicting sales of item listings within a network-based system. The system 200 can include a set of prediction modules 202, a search engine 208 and the database 126. The prediction modules 202 is configurable to rank a set of search results according to the potential for each item listing to be sold within the networked system 102. In certain examples the prediction modules 202 can include a training module 204 and a prediction module 206.

The training module 204 is configurable to access historical transaction data from the database 126 to develop a training set of potential purchase criteria (e.g., prediction features). The prediction module 206 is configurable to use the training set developed by the training module 204 to predict an item listing's potential for being sold. The search engine 208 is configurable to provide a set of search results to the prediction module 206 for ranking by the potential for successful sale of each item within the search results.

Further details concerning the methods of operation of the prediction modules 202, search engine 208 and database 126 are discussed below in reference to FIGS. 4 and 5.

Recommendation Modules

Figure 3:
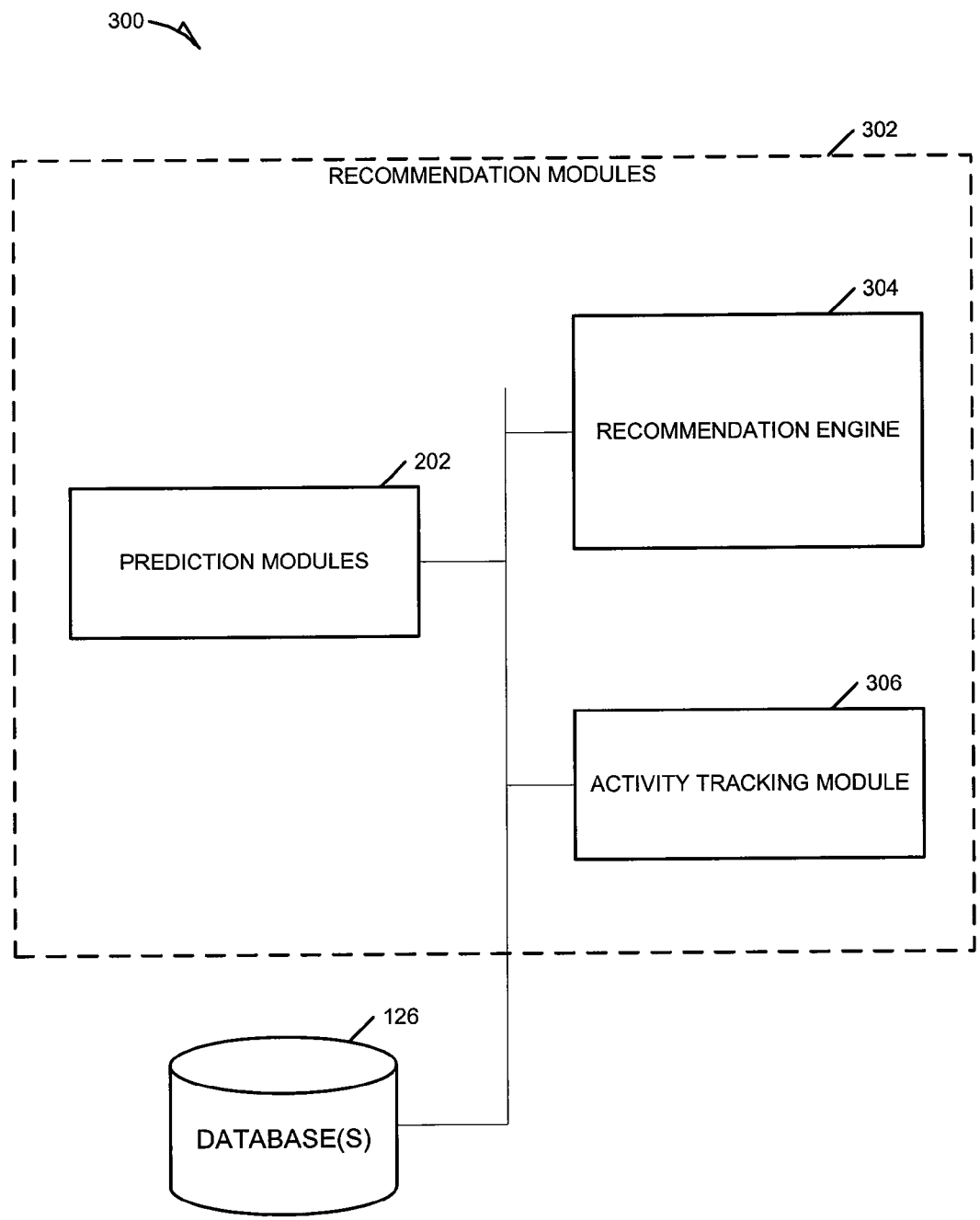
FIG. 3 is a block diagram illustrating an example system for making recommendations using predicted sales of a listing within a network-based system.

FIG. 3 is a block diagram illustrating an example system 300 for making recommendations based on predicted likelihood of sale within a network-based system. The system 300 can include the recommendation modules 302 and the databases 126. In certain examples, the recommendation modules 302 can include the prediction modules 202, a recommendation engine 304, and an activity tracking module 306.

The activity tracking module 306 is configurable to track real-time user activity on the networked system 102. This real-time data can be passed to the recommendation engine 304 to detect potential recommendation opportunities. Certain user activity, such as viewing an item listing, can be detected as potential recommendation opportunities. For example, if a user selects a certain item listing to view, the recommendation engine 304 can determine that additional items should be recommended while the user is viewing the selected item. Determining which items to recommend can include using the prediction modules 202 to rank potential recommendations by the item's predicted likelihood of being sold.

The recommendation engine 304 can be configured to make recommendations based on a user's current activity, the relationships between related objects (e.g., categories and items), and predicted likelihood of being sold. The recommendation engine 304 can access relationship data stored in the database 126 and can receive activity data from the activity tracking module 306. In some examples, the recommendation engine 304 may also communicate with the prediction modules 202.

Figure 6:
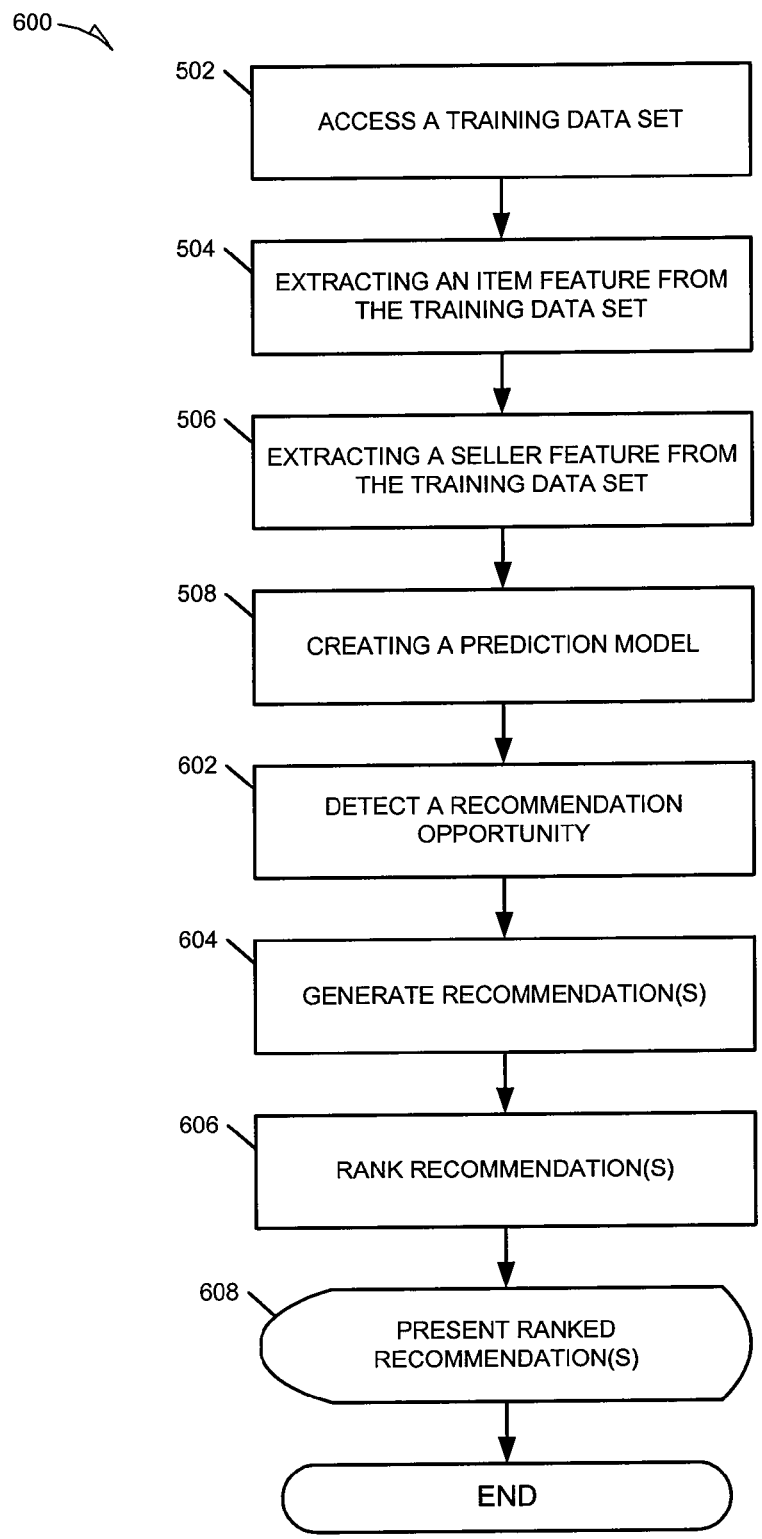
FIG. 6 is a flow chart illustrating an example method for providing recommendations based on predicted sales within a network-based system.

Additional details regarding the functionality provided by the recommendation modules 302 are discussed in reference to FIG. 6.

Predicting Sales of Item Listings Methods

Figure 4:
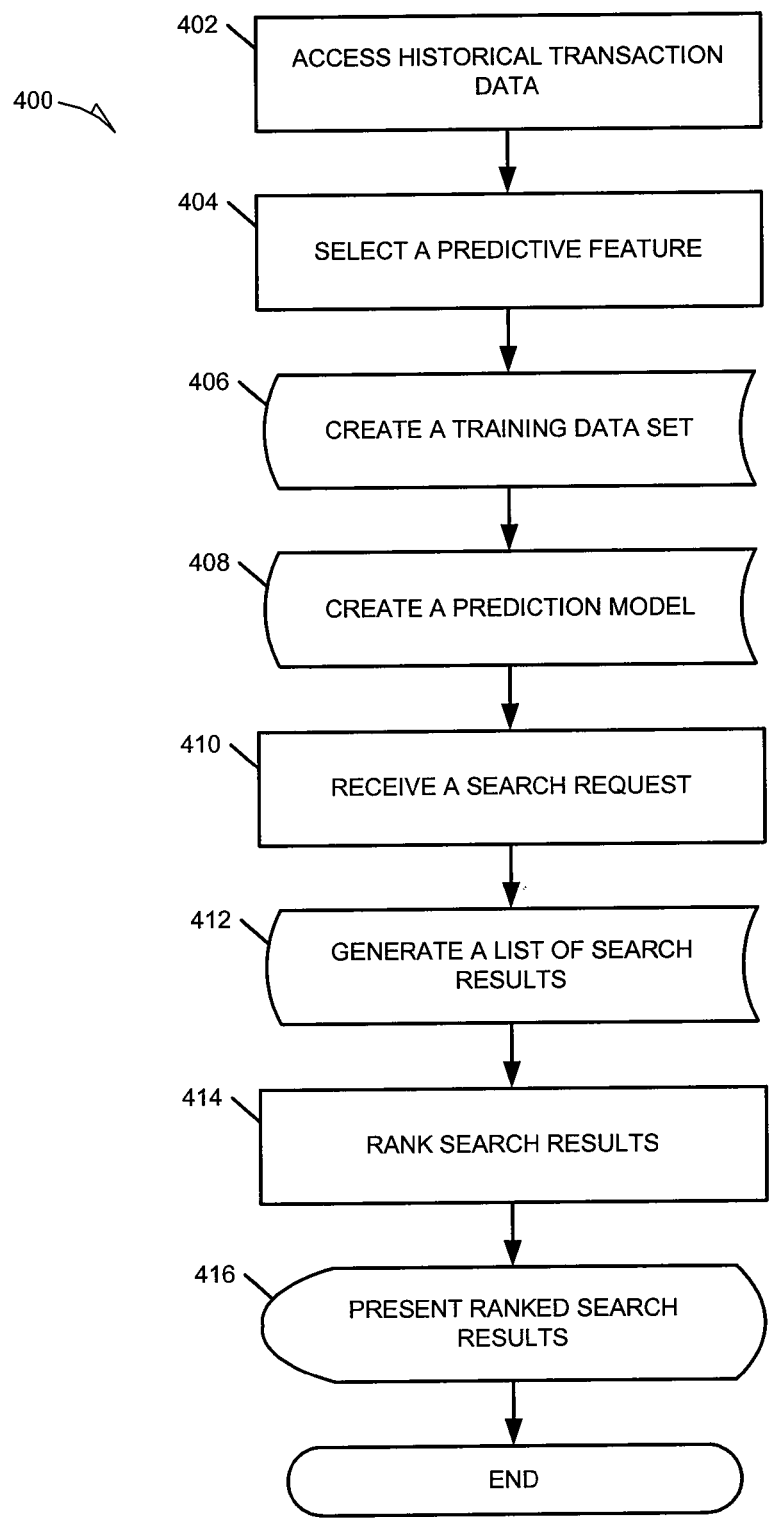
FIG. 4 is a flow chart illustrating an example method for predicting sales of listings within a network-based system.

FIG. 4 is a flow chart illustrating an example method for predicting sales of listings within a network-based system. The method 400 may be performed by processing logic that may comprise hardware (e.g., dedicated logic, programmable logic, microcode, etc.), software (such as executes on a general purpose computer system or a dedicated machine), or a combination of both. In an example embodiment, the processing logic resides within the prediction modules 202 illustrated in FIG. 2. The method 400 may be performed by the various modules discussed above with reference to FIGS. 1 and 2. Each of these modules may comprise processing logic.

As shown in FIG. 4, the method 400 includes operations for accessing historical transaction data 402, selecting a predictive feature 404, creating a training data set 406, creating a prediction model 408, receiving a search request 410, generating a list of search results 412, ranking the search results 414, and presenting the ranked search results 416. Method 400 commences at operation 402 with the training module 204 accessing historical transaction data from the database 126. At operation 404, the method 400 continues with the training module 204 selecting a predictive feature to extract from the historical transaction data stored in the database 126. In an example, the predictive feature is selected from the list of item and seller features provided in Table 1 above. In another example, a predictive feature not listed is selected for use in creating a training data set. Predictive features can include any attribute associated with the item listing or seller who published the item listing within the networked system 102. Predictive features are generally features that are indicative of whether a particular item listing is going to be sold within the networked system 102. Method 400 continues at operation 406 with the training module 204 creating a training data set from the extracted predictive feature. In certain examples, the training data set can include multiple predictive features.

In examples including multiple predictive features, the selected predictive features can include both item and seller features.

Once the training set has been created, the method 400 moves on to operation 408 where the prediction module 206 creates a prediction model. As outlined above, an exemplary embodiment includes creating prediction models using either linear regression or logistic regression. For either of the regression models, the training data set created in operation 406 can be input as one of the variables (vector of predictive features).

The method 400 continues at operations 410 and 412 with the search engine 208 receiving a search request and generating a list of search results. The search results are fed into the prediction module 206 at operation 414. The prediction module 206 ranks the search results using the prediction model according to the likelihood of conversion for each item listing in the search results. The method 400 finishes at operation 416 by presenting the ranked search results to a user on the networked system 102.

Figure 5:
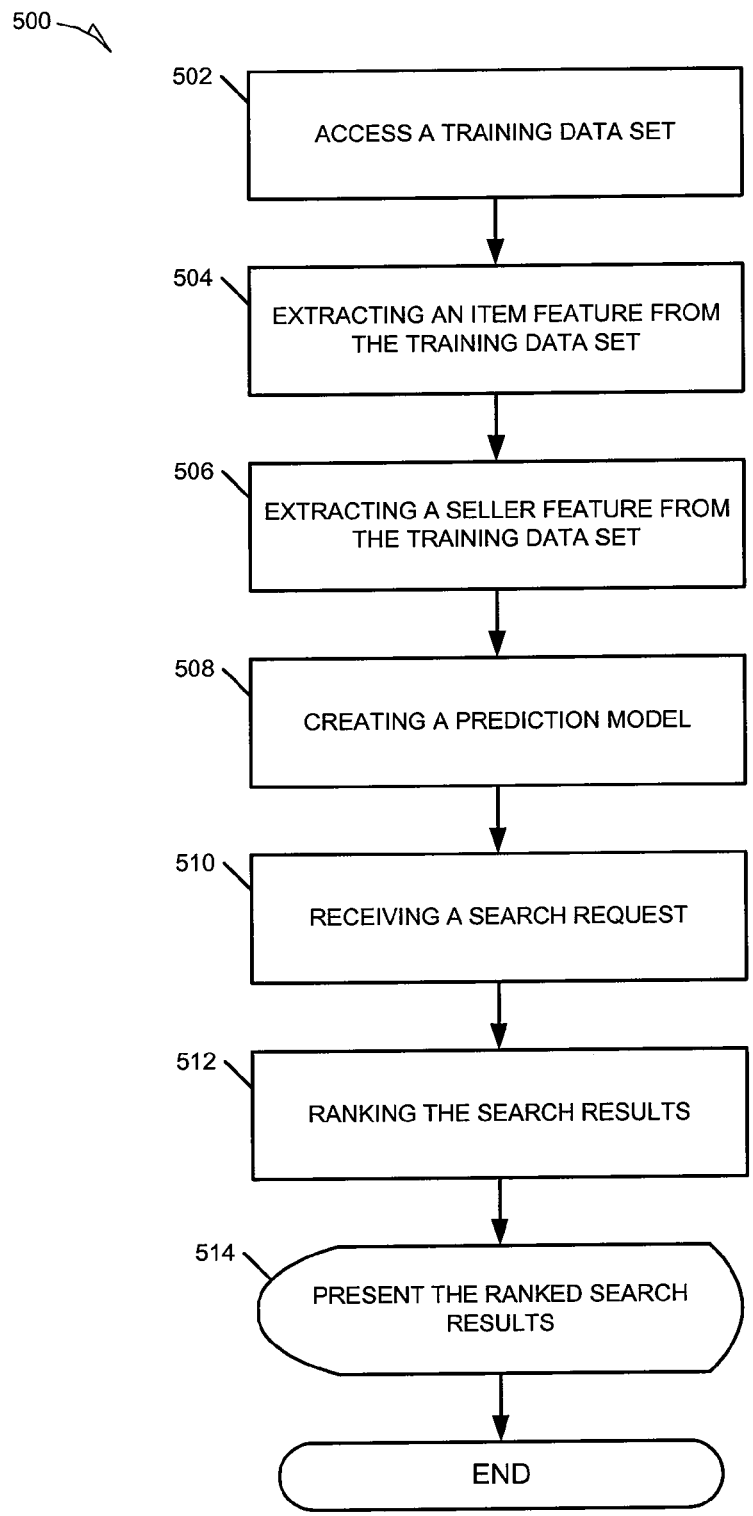
FIG. 5 is a flow chart illustrating an example method for predicting sales of listings within a network-based system.

FIG. 5 is a flow chart illustrating an example method 500 for predicting sales of listings within a network-based system. The method 500 may be performed by processing logic that may comprise hardware (e.g., dedicated logic, programmable logic, microcode, etc.), software (such as executes on a general purpose computer system or a dedicated machine), or a combination of both. In an example embodiment, the processing logic resides within the prediction modules 202 illustrated in FIG. 2. The method 500 may be performed by the various modules discussed above with reference to FIGS. 1 and 2. Each of these modules may comprise processing logic.

As shown in FIG. 5, the method 500 includes operations for accessing a training data set 502, extracting an item feature from the training data set 504, extracting a seller feature from the training data set 506, creating a prediction model 508, receiving a search request 510, ranking the search results 512, and presenting the ranked search results 514. The method 500 commences at operation 502 with the training module 204 accessing a training data set. In certain examples, the training data set can be stored in the database 126. The training data set can include historical transaction data collected by the networked system 102. At operations 504 and 506, the training module 204 extracts item feature data and seller feature data from the training data set, respectively. In some examples, multiple item features or multiple seller features can be extracted for use in creating a prediction model. The method 500 continues at operation 508 with the prediction module 206 receiving the extracted item and seller features in order to create a prediction model. The prediction model can be created by using machine learning algorithms as described above. The prediction module 206 creates one or more prediction models that are subsequently used to rank search results or potential recommendations. The prediction model ranks input item listings according to the item listings' probability of being successfully sold within the networked system 102.

The method 500 continues at operation 510 with the search engine 208 receiving a search request from a user of the networked system 102. In this example, the method 500 continues at operation 512 with the search engine 208 using the prediction model created by the prediction module 206 to rank the search results based on predicted probability of each search result being sold. In another example, the search results are passed to the prediction module 206, which ranks the search results according to the prediction model and returns them to the search engine 208. In yet another example, the search results can be passed to the prediction module 206, which ranks the search results according to the prediction model and handles the presentation at operation 514. The method 500 concludes at operation 514 with the ranked search results being presented by the networked system 102.

FIG. 6 is a flow chart illustrating an example method for providing recommendations based on predicted sales within a network-based system. The method 600 may be performed by processing logic that may comprise hardware (e.g., dedicated logic, programmable logic, microcode, etc.), software (such as executes on a general purpose computer system or a dedicated machine), or a combination of both. In an example embodiment, the processing logic resides within the recommendation modules 302 illustrated in FIG. 3. The method 600 may be performed by the various modules discussed above with reference to FIGS. 1 and 3. Each of these modules may comprise processing logic.

As shown in FIG. 6, the method 600 includes operations for accessing a training data set 502, extracting an item feature from the training data set 504, extracting a seller feature from the training data set 506, creating a prediction model 508, detecting a recommendation opportunity 602, generating recommendation(s) 604, ranking the recommendations 606, and presenting the ranked recommendation(s) 608. The operations 502 through 508 to create a prediction model are described in detail above in reference to FIG. 5. An alternative method 600 (not pictured) creates a prediction model in a manner similar to that depicted in FIG. 4.

Once the prediction model is created, the method 600 continues at operation 602 with the recommendation engine 304 detecting a recommendation opportunity. In an example, the recommendation opportunity is detected by analyzing data collected by the activity tracking module 308. In another example, the activity tracking module 308 handles the detection of a recommendation opportunity. For example, when a user views a particular item listing, the activity tracking module 308 flags this as a recommendation opportunity and cues the recommendation engine 304 to produce recommendations related to the viewed item. In another example, the activity tracking module 308 detects a user in a checkout process purchasing a certain product on the networked system 102. In this example, the activity tracking module 308 cues the recommendation engine 304 to provide recommended accessories complementary to the items being purchased.

The method 600 continues at operation 604 with the recommendation engine 304 generating one or more recommendations based on the detected recommendation opportunity. The recommendation is based on standard collaborative filtering algorithms or a substitute/complement relationship recommendation such the one described in co-pending U.S. patent application Ser. No. 12/603,348, entitled "SYSTEMS AND METHODS FOR MAKING CONTEXTUAL RECOMMENDATIONS.", filed on Oct. 21, 2009. Once the recommendations have been generated by the recommendation engine 304, the method 600 continues at operation 606 with the prediction module 206 ranking the recommendations using the prediction model. In another example, the recommendation engine 304 is configured to use the prediction model to rank the recommendations at operation 606. The method 600 concludes at operation 608 with the networked system 102 presenting the ranked recommendations to a user.

Modules, Components and Logic

Certain embodiments are described herein as including logic or a number of components, modules, or mechanisms.

Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of these. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
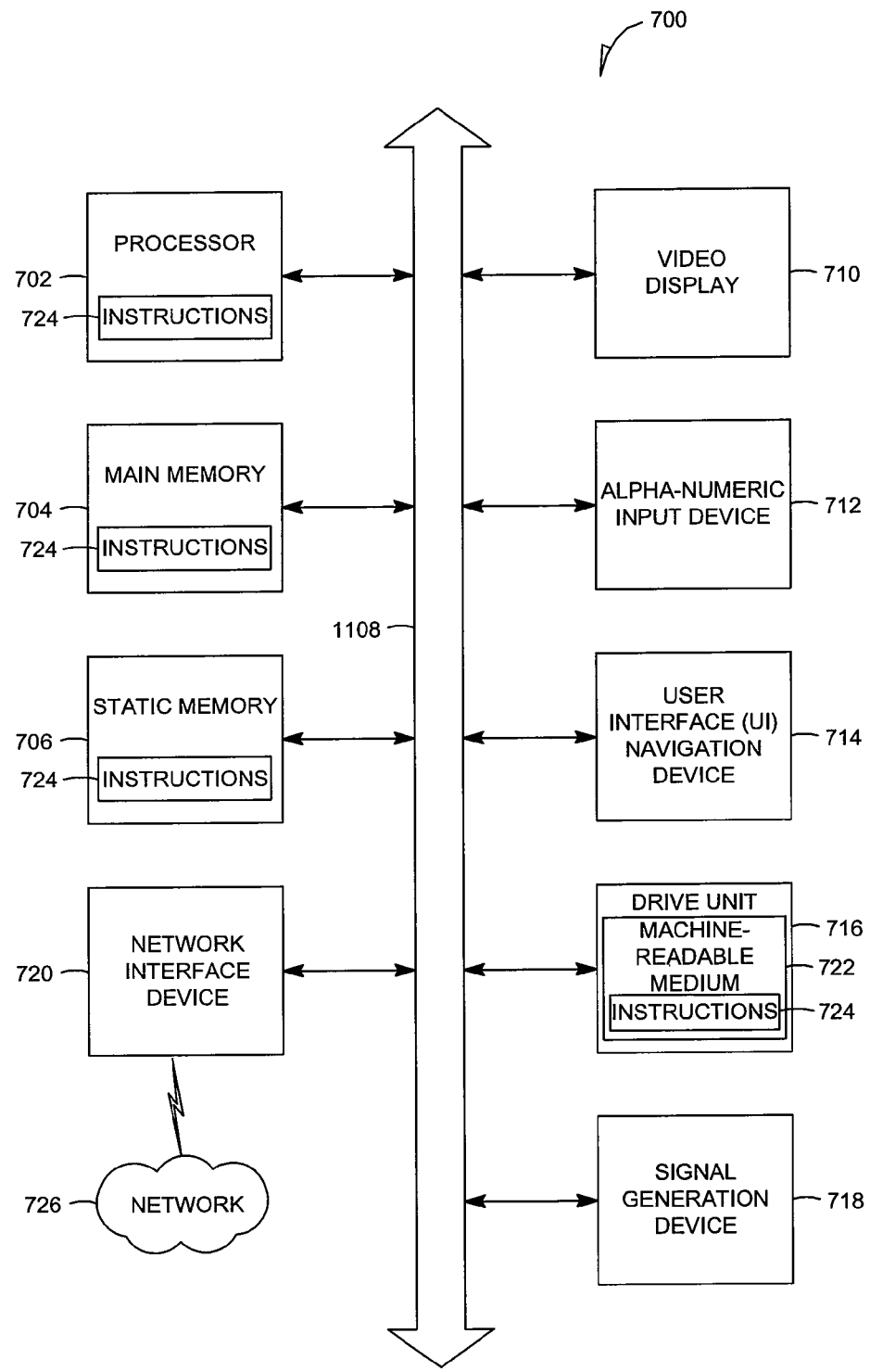
FIG. 7 is a diagrammatic representation of a machine in the example form of a computer system within which a set of instructions for causing the machine to perform any one or more of the methodologies discussed herein, may be executed.

FIG. 7 is a block diagram of a machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of data structures and instructions (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more data structures and instructions 724. The term "machine-readable medium" shall also be taken to include any tangible medium that is capable of storing, encoding or carrying instructions for execution by the machine and that cause the machine to perform any one or more of the methodologies of the present embodiments of the invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HyperText Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present embodiments of the invention has been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method to rank search results comprising:
   accessing, using one or more processors within a network-based system, historical transaction data;
   selecting, using the one or more processors, a plurality of predictive features that are predictive of an item being sold over the network-based system, selecting the plurality of predictive features includes using a regression model to determine the plurality of predictive features with the highest correlation to items being sold, wherein the selecting includes selecting a category related feature, a seller related feature, and an item related feature;
   creating, using the one or more processors, a training data set including extracting the plurality of predictive features from the historical transaction data;
   creating, using the one or more processors, a prediction model based on the training data set to predict a probability that an item offered for sale by an item listing published on the network-based system will be sold;
   receiving a search request on the network-based system;
   generating, using the one or more processors, a list of search results based on the search request;
   ranking, using the one or more processors, the list of search results using the prediction model; and
   presenting, using the one or more processors, the ranked search results.

2. The method of claim 1, wherein the creating of the prediction model includes learning a regression model from the training data set.

3. The method of claim 2, wherein the learning of the regression model includes using at least one of linear regression and logistic regression techniques.

4. The method of claim 1, wherein the plurality of predictive features further includes at least one of:
   item velocity;
   item popularity;
   number of competitors on the network-based system;
   conversion rate of similar items;
   price;
   sale type;
   item quantity;
   item return policy level;
   best offer, and
   store inventory.

5. The method of claim 1, wherein the creating of the training data set includes extracting a seller feature from the historical transaction data.

6. The method of claim 5, wherein the extracting the seller feature includes selecting the seller feature from a group including:
   a feedback score;
   a percentage of positive feedback;
   a seller level; and
   a type of seller.

7. A method to rank item listings according to predicted sales in a network-based system, the method comprising:
   accessing, using one or more processors within the network-based system, a training data set including historical transaction data generated by the network-based system;
   extracting, using the one or more processors, a plurality of item features from the training data set, extracting the plurality of item features includes using a regression model to determine the plurality of item features with the highest correlation to items being sold;
   extracting, using the one or more processors, a seller feature from the training data set, the seller feature being an attribute of a seller within the network-based system, the extracting the seller feature includes using a regression model to determine the seller feature with the highest correlation to items being sold;
   extracting, using the one or more processors, a category feature from the training data set, the extracting the category feature includes using a regression model to determine the category feature with the highest correlation to items being sold;
   creating, using the one or more processors a prediction model using the plurality of item features, the category feature, and the seller feature;
   receiving, using the one or more processors, a search request for item listings on the network-based system;
   using the prediction model, ranking, using the one or more processors, a result set generated using the search request; and
   presenting, using the one or more processors, the ranked search results.

8. The method of claim 7, wherein the creating of the prediction model includes creating a regression model based on the training data set.

9. The method of claim 8, wherein the creating of the regression model includes using at least one of linear regression and logistic regression techniques.

10. The method of claim 7, wherein the plurality of item features further include at least one of:
- item velocity;
- item popularity;
- number of competitors on the network-based system;
- conversion rate of similar items;
- price;
- sale type;
- item quantity;
- item return policy level;
- best offer, and
- store inventory.

11. A network-based system to rank search results, the system comprising:
- a database to maintain historical transaction data;
- a server including a processor coupled to a memory device, the processor and the memory device configured to execute modules and engines including:
- a training module to create a training data set including a plurality of predictive features, the plurality of predictive features being predicative of an item offered for sale on the network at the system being successfully sold, the plurality of predictive features being extracted from the historical transaction data maintained in the database, and wherein the training module is to select the plurality of predictive features using a regression model to determine the plurality of predictive features with the highest correlation to items being sold, wherein the plurality of predictive features selected include a category related feature, a seller related feature, and an item related feature;
- a prediction module to rank search results based upon a prediction model calculated using the training data set,
- a search engine to receive a search request, generate a list of search results based on the search request, and communicate the list of search results to the prediction module for ranking; and
- a presentation engine to present the list of search results ranked by the prediction module.

12. The network-based system of claim 11, wherein the prediction module is to create the prediction model by calculating a regression model from the training data set.

13. The network-based system of claim 12, wherein the prediction module is to calculate the regression model using at least one of linear regression and logistic regression techniques.

14. The network-based system of claim 11, wherein the training module is to select the plurality of predictive features from a group including:
- category popularity;
- item velocity;
- item popularity
- number of competitors on the network-based system;
- conversion rate of similar items;
- price;
- sale type;
- item quantity;
- item return policy level;
- best offer, and
- store inventory.

15. The network-based system of claim 11, wherein the training module is to create the training data set to further include a seller feature extracted from the historical transaction data.

16. The network-based system of claim 15, wherein the training module is to select the seller feature from a group including:
- a feedback score;
- a percentage of positive feedback;
- a seller level; and
- a type of seller.

17. A non-transitory machine-readable storage medium embodying instructions which, when executed by a computer-implemented network-based system, cause the computer-implemented network-based system to execute a method comprising:
- accessing historical transaction data;
- selecting a plurality of predictive features that are predictive of an item being sold over the network-based system, selecting the plurality of predictive features includes using a regression model to determine the plurality of predictive features with the highest correlation to items being sold, wherein the selecting includes selecting a category related feature, a seller related feature, and an item related feature;
- creating a training data set including extracting the plurality of predictive features from the historical transaction data;
- creating a prediction model based on the training data set to predict a probability that an item offered for sale by an item listing will be sold on the network-based system;
- receiving a search request on the network-based system;
- generating a list of search results based on the search request;
- ranking the list of search results using the prediction model; and
- presenting the ranked search results.

18. The non-transitory machine-readable storage medium of claim 17, wherein the creating of the prediction model includes learning a regression model from the training data set.

19. The non-transitory machine-readable storage medium of claim 18, wherein the learning of the regression model includes using at least one of linear regression and logistic regression techniques.

20. The non-transitory machine-readable storage medium of claim 17, wherein the plurality of predictive features further includes at least one of:
- item velocity;
- item popularity;
- number of competitors on the network-based system;
- conversion rate of similar items;
- price;
- sale type;
- item quantity;
- item return policy level;
- best offer, and
- store inventory.

21. The non-transitory machine-readable storage medium of claim 17, wherein the creating of the training data set includes extracting a seller feature from the historical transaction data.

22. The non-transitory machine-readable storage medium of claim 21, wherein the extracting the seller feature includes selecting the seller feature from a group including:
- a feedback score;
- a percentage of positive feedback;
- a seller level; and
- a type of seller.

* * * * *